United States Patent
Keithley (10) Patent No.: US 9,998,867 B2
(45) Date of Patent: Jun. 12, 2018

(54) CONTENT DISCOVERY USING BEACONS

(71) Applicant: Apple Inc., Cupertino, CA (US)

(72) Inventor: Craig J. Keithley, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days. days.

(21) Appl. No.: 14/500,683

(22) Filed: Sep. 29, 2014

(65) Prior Publication Data

US 2016/0094946 A1    Mar. 31, 2016

(51) Int. Cl.
| | | |
|---|---|---|
| *H04W 4/02* | (2018.01) | |
| *H04W 40/24* | (2009.01) | |
| *H04W 84/18* | (2009.01) | |
| *H04W 4/70* | (2018.01) | |
| *H04W 4/80* | (2018.01) | |
| *H04W 4/04* | (2009.01) | |

(52) U.S. Cl.
CPC ............ *H04W 4/023* (2013.01); *H04W 4/043* (2013.01); *H04W 4/70* (2018.02); *H04W 4/80* (2018.02); *H04W 40/244* (2013.01); *H04W 84/18* (2013.01)

(58) Field of Classification Search
USPC ............... 455/41.1, 41.2, 456.1–457, 566
See application file for complete search history.

(56) References Cited

U.S. PATENT DOCUMENTS

| | | | |
|---|---|---|---|
| 7,397,424 B2 | 7/2008 | Houri | |
| 7,856,234 B2 | 12/2010 | Alizadeh-Shabdiz et al. | |
| 7,899,583 B2 | 3/2011 | Mendelson | |
| 7,924,149 B2 | 4/2011 | Mendelson | |
| 8,054,219 B2 | 11/2011 | Alizadeh-Shabdiz | |
| 8,223,074 B2 | 7/2012 | Alizadeh-Shabdiz | |
| 8,369,264 B2 | 2/2013 | Brachet et al. | |
| 8,478,297 B2 | 7/2013 | Morgan et al. | |
| 8,836,580 B2 | 9/2014 | Mendelson | |
| 8,866,673 B2 | 10/2014 | Mendelson | |
| 8,896,485 B2 | 11/2014 | Mendelson | |
| 8,941,485 B1 | 1/2015 | Mendelson | |
| 8,983,493 B2 | 3/2015 | Brachet et al. | |
| 9,020,687 B2 | 4/2015 | Mendelson | |
| 9,204,251 B1 | 12/2015 | Mendelson | |
| 9,204,257 B1 | 12/2015 | Mendelson | |
| 9,877,138 B1* | 1/2018 | Franklin | H04W 4/003 |
| 2007/0042749 A1* | 2/2007 | Ben Ayed | H04W 4/02 455/404.2 |
| 2008/0109317 A1 | 5/2008 | Singh | |
| 2010/0100582 A1* | 4/2010 | Beatty | H04L 67/16 709/203 |

(Continued)

*Primary Examiner* — Steven Kelley
(74) *Attorney, Agent, or Firm* — Fish & Richardson P.C.

(57) ABSTRACT

A radio frequency (RF) beacon deployed in an indoor or outdoor environment broadcasts an RF signal that can be received by a client device operating in the environment. Based on information provided by the beacon and client device sensor data, content (e.g., a software application) locally relevant to the environment is recommended to a user of the client device. The recommended content can be manually or automatically downloaded and installed on the client device so that it can be used in the environment. In some implementations, sensor data is used to indicate whether the user is interested in receiving the recommendation and is capable of receiving the recommendation.

25 Claims, 8 Drawing Sheets

(56) References Cited

U.S. PATENT DOCUMENTS

| | | | |
|---|---|---|---|
| 2010/0222046 A1* | 9/2010 | Cumming | G06Q 30/02 |
| | | | 455/418 |
| 2011/0295551 A1 | 12/2011 | Rasanen et al. | |
| 2011/0312349 A1* | 12/2011 | Forutanpour | G06F 1/1626 |
| | | | 455/466 |
| 2012/0064855 A1 | 3/2012 | Mendelson | |
| 2012/0135680 A1 | 5/2012 | DeLuca | |
| 2013/0132277 A1 | 5/2013 | Naqvi | |
| 2013/0288655 A1* | 10/2013 | Foruntanpour | H04M 1/6008 |
| | | | 455/418 |
| 2013/0297422 A1* | 11/2013 | Hunter | G06Q 30/0261 |
| | | | 705/14.58 |
| 2013/0346240 A1* | 12/2013 | Roberts | G06Q 30/0261 |
| | | | 705/26.9 |
| 2014/0068451 A1 | 3/2014 | Ngo et al. | |
| 2014/0075328 A1 | 3/2014 | Hansen et al. | |
| 2014/0113560 A1* | 4/2014 | Graube | H04B 7/26 |
| | | | 455/41.2 |
| 2014/0143060 A1 | 5/2014 | Fernandez | |
| 2014/0201675 A1 | 7/2014 | Joo et al. | |
| 2015/0065170 A1* | 3/2015 | Brisebois | H04W 4/003 |
| | | | 455/456.3 |

\* cited by examiner

BEACON DATABASE – ACME CORPORATION

| Proximity ID (UUID) | Major | Minor | TX Power (dBm) | PDU Type | PDU Payload |
|---|---|---|---|---|---|
| B9407F20-0000-1000-8000-00805F9B34FB | 001 | 001 | 20 | 0010 | http://.acme.com/shopping_app |
| B9407F20-0000-1000-8000-00805F9B34FB | 001 | 002 | 0 | 0010 | http://weeklyad.acme.com/redwood-city-ca-94063/electronics?sort=title# |

FIG. 3A

BEACON DATABASE – ACME CORPORATION

| Proximity ID (UUID) | Major | Minor | Range Class | Message |
|---|---|---|---|---|
| B9407F20-0000-1000-8000-00805F9B34FB | 001 | 001 | Far | Welcome To Acme! click for store map |
| B9407F20-0000-1000-8000-00805F9B34FB | 001 | 002 | Near | ACME APP AVAILABLE click to download |

CONTENT DISCOVERY USING BEACONS

TECHNICAL FIELD

This disclosure relates generally to radio frequency (RF) beacon technology and location-based services.

BACKGROUND

Bluetooth® low energy (BLE) (also referred to as Bluetooth® Smart) is a wireless personal area network (PAN) technology that can be used for a variety of client device applications and is intended to provide reduced power consumption and cost while maintaining a similar communication range as Bluetooth®. Many mobile device operating systems for smart phones, tablet computers and wearable devices support Bluetooth® Smart. The technical specifications for BLE are described in Bluetooth® Core Specification 4.0, which is a public document made available online by Bluetooth® Special Interest Group (SIG).

One potential application provided by BLE technology is proximity sensing. BLE beacons broadcast a Universally Unique Identifier (UUID), which can be detected by a compatible application or operating system running on a client device and used to determine the physical location of the client device or trigger an action on the client device.

SUMMARY

A radio frequency (RF) beacon deployed in an indoor or outdoor environment broadcasts an RF signal that can be received by a client device operating in the environment. Based on information provided by the beacon and client device sensor data, content (e.g., a software application) locally relevant to the environment is recommended to a user of the client device. The recommended content can be manually or automatically downloaded and installed on the client device so that it can be used in the environment.

In some implementations, sensor data is used to indicate whether the user is interested in receiving the recommendation and is capable of receiving the recommendation. In some implementations, the sensor data indicates that the client device is on the user's body, is stationary or moving and whether a display of the client device is visible to the user. Based on the sensor data and beacon information, a recommendation (e.g., an icon) for an application is presented on the display. In some implementations where the display is not visible to the user, feedback can be provided (e.g., vibration, audio) by the client device to alert the user that a recommendation is available. In some implementations, the beacon is placed proximate (e.g., behind) advertising signage.

In some implementations, the beacon provides a link to a network-based digital media store to download content that is relevant to the local environment. In some implementations, a beacon management service can be used by an enterprise to commission beacons in an environment and to specify a payload for an advertising message to be broadcast by the beacon to client devices in the environment. In some implementations, the payload (e.g., a URL) can be used to direct a browser on the client device to the recommended content stored in a database of content at the digital media store. In other implementations, the payload can provide data for indirectly obtaining a URL. For example, the payload can include a beacon UUID, which is then matched to a list of URLs stored on the client device or elsewhere (e.g., stored on a network database).

In some implementations, a method comprises: receiving, by a device operating in an environment, a radio frequency (RF) signal from an RF beacon deployed in the environment, the RF signal including data for accessing a locally relevant content at a network-based digital media store; determining user interest and capability for receiving a recommendation for the locally relevant content based on sensor data provided by the device; and presenting the recommendation for the content on a display of the device.

Other implementations are directed to systems, devices and non-transitory, computer-readable storage mediums. Particular implementations disclosed herein provide one or more of the following advantages. Enterprises provide users with locally relevant content (e.g., a software application) when the user is present in a beacon environment (e.g., a retail chain store). The content can be used to target advertising to users based on their location and interests and also facilitate transactions at a point of sale. Users can automatically receive a recommendation for locally relevant content, even if the user has not previously downloaded the content. The user can optionally download and install the recommended content for use in the local environment.

The details of the disclosed implementations are set forth in the accompanying drawings and the description below. Other features, objects and advantages are apparent from the description, drawings and claims.

DESCRIPTION OF DRAWINGS

The same reference symbol used in various drawings indicates like elements.

DETAILED DESCRIPTION

Example Operating Environment

Figure 1:
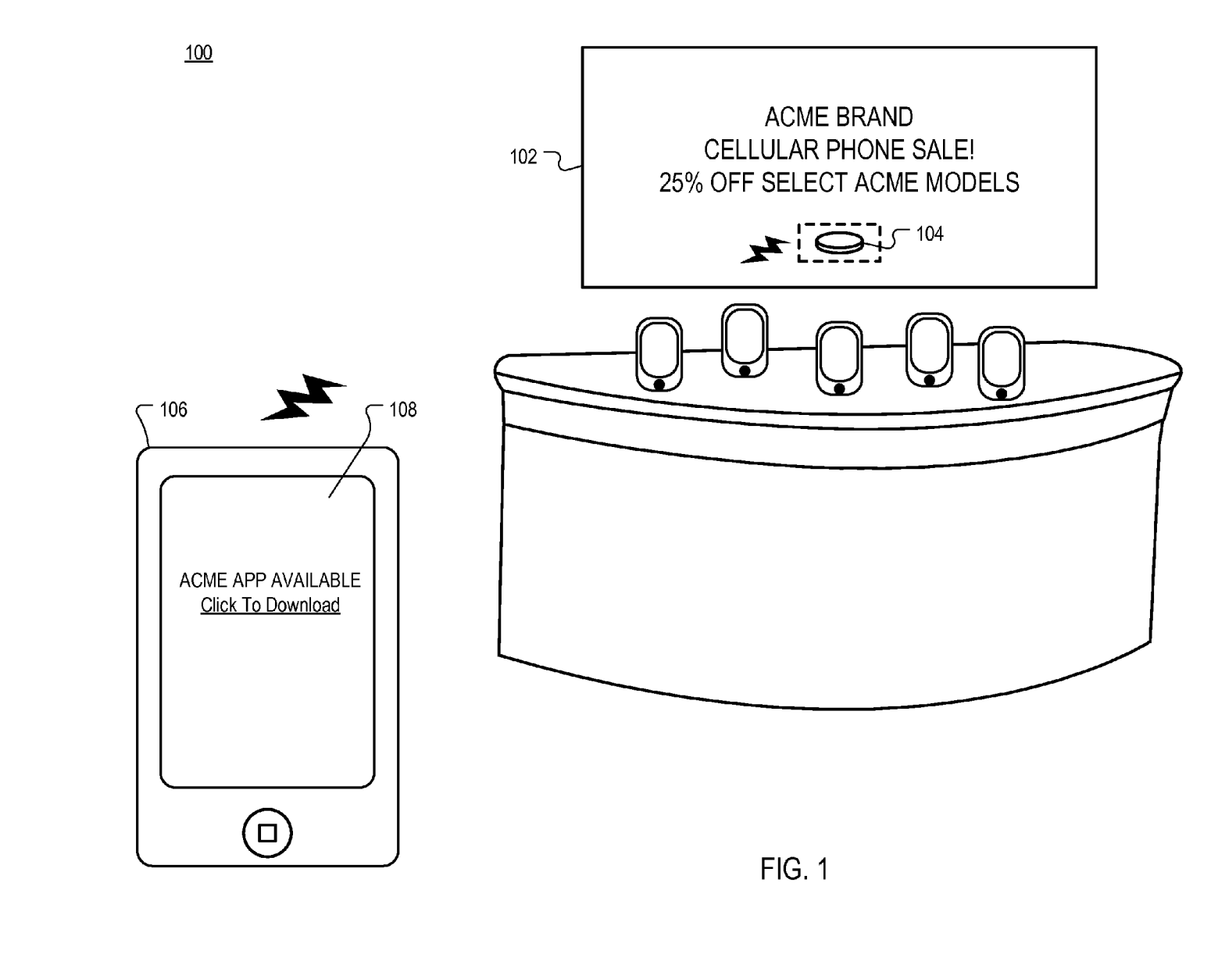
FIG. 1 illustrates an example operating environment for content discovery using beacons.

FIG. 1 illustrates an example operating environment 100 for content discovery using beacons. Generally, environment 100 can be any indoor or outdoor environment where at least one beacon 104 is deployed. In the example shown, environment 100 is a chain retail store operated by a fictitious Acme Corporation. The store includes a cell phone display with advertising signage 102. RF beacon 104 (e.g., a BLE beacon) is deployed behind advertising signage 102. The store can have other beacons deployed, including a beacon at the entrance of the store and at one or more sections or departments in the store (e.g., the electronics section where the cell phone display is located). When client device 106 is in communication range of beacon 104, client device 106 can receive a recommendation for content that is relevant to environment 100. Content can be a software application and/or digital media (e.g., a video, audio file, map, digital photo, advertisement). In the examples described below, the locally relevant content is a software application, and in particular, an ACME shopping application.

The recommendation is presented on display 108 of client device 106. In some implementations, the recommendation includes text and a link (e.g., web address or URL) that the user can click to access the application at a network-based digital media store. The link can be provided by beacon 104 and can be programmed through a beacon manager portal, as described in reference to FIG. 6. In some implementations, when the user clicks on the link a browser application is launched on client device 106 and is directed to the locally relevant application at the network-based digital media store, where the user can access and/or download the application for use in the store. In other implementations, data can be provided by the beacon 104 that allows the link to be indirectly obtained from another location. For example, the beacon can provide a UUID, which is then matched to a list of URLs stored on the client device or elsewhere (e.g., stored on a network database).

Example Beacon Management Service

Figure 2:
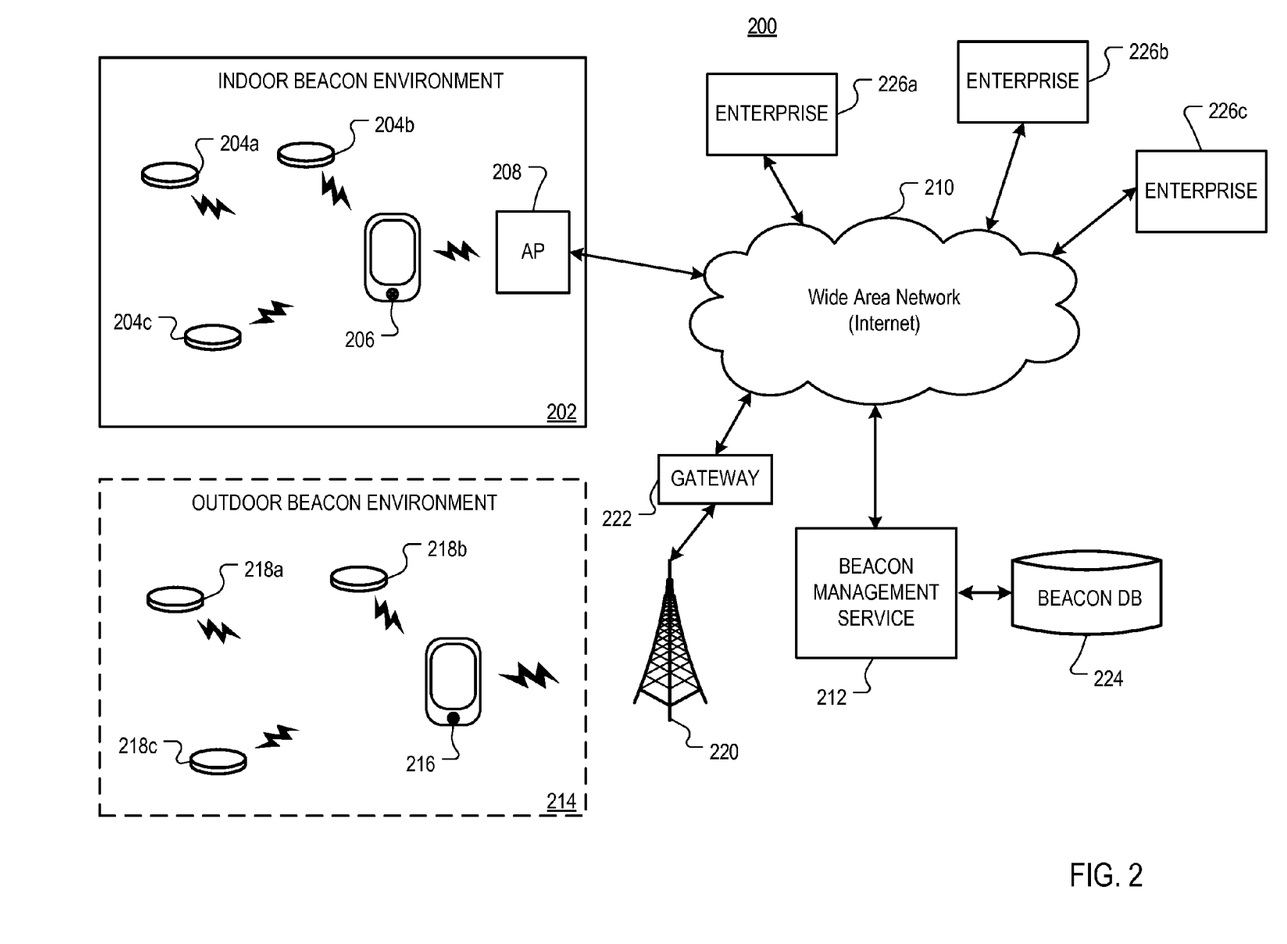
FIG. 2 is an example operating environment for providing beacon management services including content discovery using beacons.

FIG. 2 illustrates an example operating environment 200 for a centralized beacon management service 212, including application discovery using beacons. Beacon management service 212 manages beacons for a plurality of enterprises 226a-226c at various indoor or outdoor locations 202, 214 (hereafter referred to as "beacon environments"). Beacon environments 202, 214 can include but are not limited to: retail stores, mass transit stations, museums, exhibitions, tradeshows, festivals, parking lots and structures, sporting and entertainment venues, airports, hospitals, libraries, etc. An "enterprise" as defined herein is any entity that deploys at least one beacon at a geographic location, including but not limited to: businesses, companies, firms, public/private organizations, government agencies/institutions, etc.

In some implementations, beacon management service 212 communicates with enterprises 226a-226c through network 210 (e.g., the Internet). Beacon management service 212 can be implemented using one or more server computers. At least one server computer can deliver web pages for a beacon management portal that can be accessed by authorized enterprise personnel or administrators using a browser running on an administrator computer, as described in reference to FIG. 6. Beacon management service 212 can access beacon database 224, which is configured to store beacon information as described in reference to FIGS. 3A and 3B. An example beacon management service is described in co-pending U.S. patent application Ser. No. 14/288,308, filed May 27, 2014, for "Centralized Beacon Management Service," which application is incorporated by reference herein in its entirety.

Client device 206 operating in beacon environment 202 communicates wirelessly with beacon management service 212 through access point (AP) 208 (e.g., WiFi access point) and network 210. Client device 206 includes a wireless transceiver that can detect radio frequency (RF) signals broadcast from beacons 204a-204c when client device 206 is within communication range of beacons 204a-204c. In the example shown, beacon environment 202 is an indoor environment (e.g., a retail chain store).

Client device 216 operating in beacon environment 214 communicates wirelessly with beacon management service 212 through cell tower 220, gateway 222 and network 210. Client device 216 includes a wireless transceiver that can detect RF signals broadcast from beacons 218a-218c when client device 216 is within communication range of beacons 218a-218c. In the example shown, beacon environment 214 is an outdoor environment (e.g., a musical festival).

Beacons 204, 218 can be BLE beacons that comply with Bluetooth Core Specification 4.0 (hereafter referred to as the "BT Specification"). Any desired number of beacons can be deployed in beacon environments 202, 214. For example, beacons can be deployed in a retail store at an entrance, section (e.g., electronics section) and display (e.g., cell phone display).

Beacons 204, 218 broadcast an advertising packet referred to as PDU (Protocol Data Unit) that includes a header that can be detected by client devices 206, 216 when configured to run in scan mode and in communication range of beacons 204, 218. When a beacon wants to broadcast, it starts an advertising event, where the same advertising packet is transmitted sequentially on each of three advertising channels as defined in the BT Specification. There are four different types of advertising packets defined by the BT Specification: non-connectable advertising, discoverable advertising, general advertising and directed advertising. For beacons broadcasting non-connectable advertising packets, the beacon transmits a string of data but does not respond to a request from a client device to make a secure connection. The string can include information (e.g., a Uniform Resource Locator (URL)) directing a browser running on the client device to a secondary online source of information, such as website accessible by cellular or WiFi communication links.

An example BLE protocol for proximity sensing is iBeacon® protocol developed by Apple Inc. (Cupertino, Calif.). iBeacon® protocol specifies data elements or identifiers that can be programmed by users, as described in reference to FIGS. 3A-3B. iBeacon® allows client devices 206, 216 to scan and detect advertising packets from an iBeacon® as a background process. Once an application is installed on client devices 206, 216, it can remain dormant until an appropriate iBeacon® is discovered. Advertising packets can be filtered and directed to specific applications installed on client devices 206, 216 or used to initiate actions on client devices 206, 216 with or without user intervention.

Beacon database 224 provides a centralized data store for enterprises 226a-226c to store their proprietary beacon information. Beacon database 224 can be a single database or a distributed database. Beacon database 224 can be a relational database that includes database tables. Beacon database 224 can include a database management system (DBMS) and schema that allows multiple enterprises to store and access beacon information for beacons used in their respective beacon environments.

In some implementations, each enterprise can be assigned one or more database tables that can be accessed through a beacon manager portal provided by beacon management service 212. As previously described, the enterprise can read and write beacon information to its database tables using the portal or a data feed. Beacon information can include any information related to the commissioning and operation of beacons, including but not limited to: proximity ID, major, minor, transmitted signal strength, PUD type, PDU payload data, device filter (e.g., white list), advertising event timing or any other information or content.

Figure 3A:
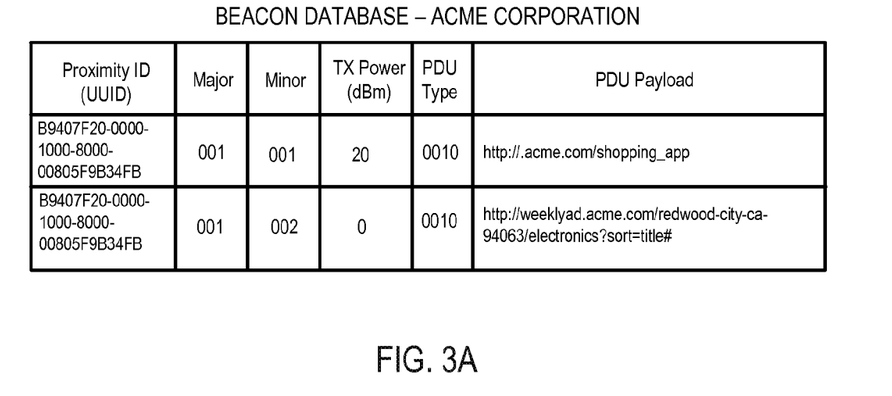
FIGS. 3A and 3B are example database tables in a beacon database of the centralized beacon management service.

FIG. 3A is an example database table for a fictitious Acme Corporation. Each row of the database represents a beacon and each column represents beacon information. The database table can include more or few columns or rows based on the application.

In the example shown, Acme Corporation is a retail chain operator with a store located in Redwood City. Proximity IDs in column one can be assigned to various subsidiaries of Acme Corporation. For this example, a single UUID is assigned to Acme Corporation. The major values in column two identify each Acme store that has a beacon environment. For example, the Redwood City store is identified by the major value 1. In the Redwood City store, Acme has deployed BLE beacons at the entrance and at a cell phone display in the electronics section. These two beacons are identified by minor values in column three as 1 and 2, respectively.

Column four allows Acme to program the transmission (TX) power of individual beacons. An example TX power range can be −23 dBm to +20 dBm. In this example, Acme programmed the beacon at the entrance to have a high transmission power (e.g., +20 dBm) to ensure broadcasts from the beacon can be detected in scans by customer client devices outside the store entrance. The beacon deployed at the entrance transmits a PDU payload that includes a URL to the Acme shopping application. The Acme shopping application can be downloaded by a client device after being discovered by the client device using the entrance beacon, as described further in reference to FIGS. 4 and 5.

The beacon at the cell phone display is programmed by Acme to have a transmission power lower than the other two beacons (e.g., 0 dBm) to ensure broadcasts from the beacon are detected in scans by customer client devices near the cell phone display. The display beacon transmits a PDU payload that includes a URL to a weekly ad page that includes cell-phone ads.

Column five of the database table includes PDU type; a parameter described in the BT Specification. The PDU type (a 4-digit number) specifies an advertising event that is one of a connectable, undirected advertising event, a connectable, directed advertising event, a non-connectable, undirected advertising event, scan request, scan response, connection request and scannable and undirected advertising event. The term "connectable" means the beacon can respond to a request from client devices to establish a secure connection with the beacon and/or beacon management service 212. In the example shown, a non-connectible, undirected advertising event is specified for all Acme beacons (0010).

Figure 3B:
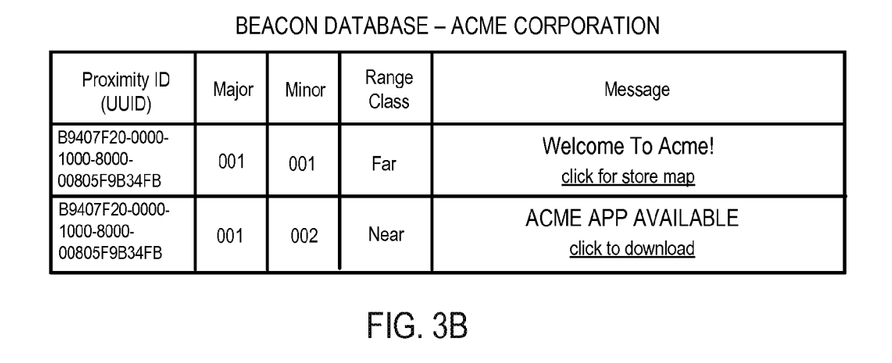

Referring to FIG. 3B, in some implementations the database table can include an association between a received signal strength indicator (RSSI) measured by a client device and a message pushed to the client device using, for example, a push notification service.

In some implementations, a range class (e.g., Far, Near, Immediate) can be transmitted to beacon management service 212 by a client device over a WiFi or cellular communication channel. The range class can be used by beacon management service 212 to trigger an advertising event, such as pushing a message to a client device. In the example shown, when a client device is "Far" from the store entrance beacon at Acme's Redwood City store (major=001, minor=001), the message "Welcome To Acme!" is displayed on the client device. A link is also displayed to access a store map. When a client device is "Near" the electronics section beacon (major=001, minor=002), the message "ACME APP AVAILABLE" is displayed on the client device. A link "click to download" is also displayed to download the Acme shopping app.

In some implementations, beacon information can include one or more time parameters that specify when a given message is broadcast by a beacon (e.g., broadcast only during business hours) or the frequency of the broadcasts (e.g., how many times a message is broadcast in an hour). In some implementations, client device context information, such as the current location of a client device (e.g., computed by GPS, WiFi, cellular) or its motion state (e.g., moving, stationary, in vehicle, on mass transit, walking, jogging, running) computed from inertial sensor data (e.g., accelerometer or gyro data), can be included in the proximity sensing data and sent to beacon management service 222 where it can be used to retrieve beacon information. An enterprise may specify different beacon information (e.g., different messages) for different contexts of a client device.

Example Client Device System

Figure 4:
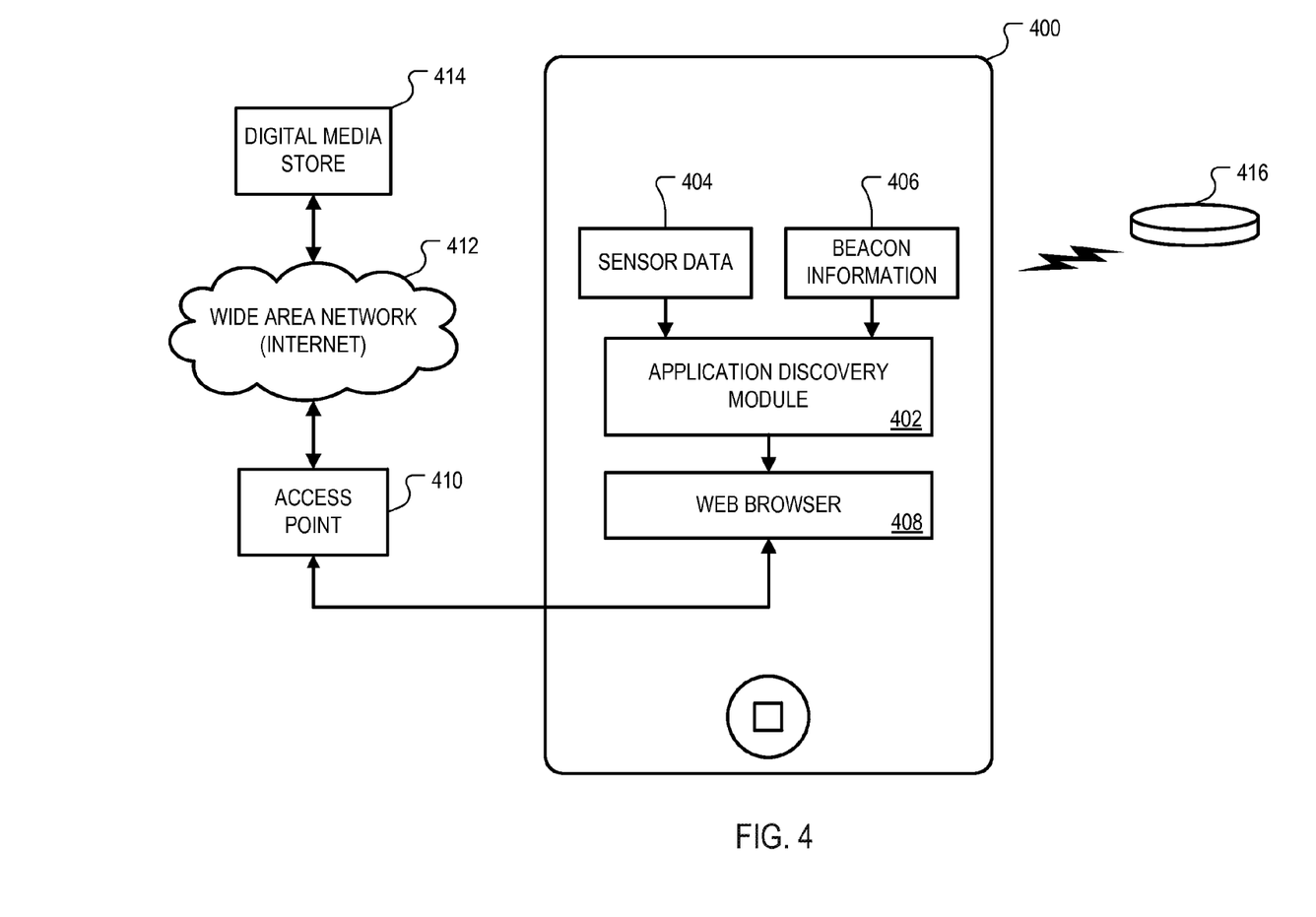
FIG. 4 illustrates an example client device system for content discovery using beacons.

FIG. 4 illustrates an example client device system for application discovery using beacons. In some implementations, client device 400 includes application discovery module 402 and web browser 408. Sensor data 404 is provided by one or more sensors onboard or coupled to client device 400. Beacon information (e.g., a PDU payload) is received from beacon 416 over a short-range communication link. In some implementations, beacon 416 is a BLE beacon. Sensor data 404 can be provided by any type of sensor, including but not limited to: accelerometers, angular rate sensors (e.g., gyro), magnetometer, positioning system (e.g., GPS, WiFi, cellular), proximity sensor and ambient light sensor, as described in reference to FIG. 7.

When client device 400 is in communication range of beacon 416 and is configured in scan mode, client device 400 receives an RF signal broadcast by beacon 416. The RF signal can include an advertising packet having a header including beacon information and a payload. The beacon information can identify the beacon with a UUID or other beacon identifier. The payload can include a message and link (direct or indirect) to a locally relevant application at network-based digital media store 414. The message can include a text message recommending the application to the user. The link can be used by web browser 408 to download a locally relevant application to client device 400 through wide area network 412 and AP 410, where it can be installed and run by the user. In some implementations, the beacon information can include trigger data for invoking an application or certain desired functionality of an application that is installed on client device 400. For example, the trigger data can be used by a client device operating system to launch a previously installed application on client device 400. Once launched, the application can be pre-populated with data that is determined directly or indirectly by beacon information. For example, a beacon operated by a restaurant can include trigger data (the name or other identifier of the restaurant) in the beacon information received by a client device that causes a reservation application to be launched and automatically navigated (e.g., using an application search application) to a custom page for the restaurant using the name or identifier.

In some implementations, when the advertising packet is received, application discovery module 402 uses sensor data 404 to determine if the user is interested in receiving a recommendation and is capable of receiving the recommendation if interested. For example, if the user is stationary in front of the entrance of the Acme store for period of time, there is high likelihood that the user is going to enter the store and thus be receptive to a recommendation to download the Acme shopping application. By contrast, if the user is moving at a particular speed past beacon 416, there is a high likelihood that the user is not receptive to receiving a recommendation to download the Acme shopping application as the user is likely to be passing by the store entrance to get to another destination. Accelerometer data can used to determine if the user is stationary or moving and, if moving, the speed at which the user is moving. Dwell time can be obtained with a software timer on client device 400. Dwell time can be defined as an amount of time that a client device is substantially stationary or the amount of time the client device stays within a given distance (e.g., radius) from beacon 416. Other sensor data 404 can also be used. For example, the user entering the store as indicated by a positioning system (e.g., GPS, WiFi, cellular, RFID, beacon) can trigger recommendation of the Acme shopping applications, as the user has indicated their interest in receiving the application by entering the store.

In some cases, the user may show interest in receiving a recommendation but is incapable of receiving the recommendation because the display is not visible to the user. This can occur, for example, when the user has placed client device 400 in a pants pocket, purse, briefcase or other container. Proximity sensor data and/or ambient light sensor data can be used to determine if client device 400 is concealed. In some implementations, application discovery module 402 can receive input from an on-body estimator that indicates if the device is on the body of the user, as described in pending U.S. application Ser. No. 13/913,271, filed on Jun. 7, 2013, for "Determination of Device Body Location," which patent application is incorporated by reference herein in its entirety.

In some implementations, application discovery module 402 can use accelerometer data and/or angular rate data to determine the orientation of client device 400 in a three-dimensional coordinate frame. Using this data, application discovery module 402 can determine if the display of the device is facing the user. If the display is facing the user, the user is likely interacting with the display and capable of receiving an application recommendation.

In the cases described above where the display is not visible, application discovery module 402 can generate an alert to make the user aware that there is an application recommendation. The alert can be, for example, tactile or force feedback (e.g., a vibration) or audio output (e.g., a tone or tone pattern, sound effect). In some implementations, the user can select the option to be alerted in a settings pane accessible on client device 400 through a GUI.

Example Processes

Figure 5:
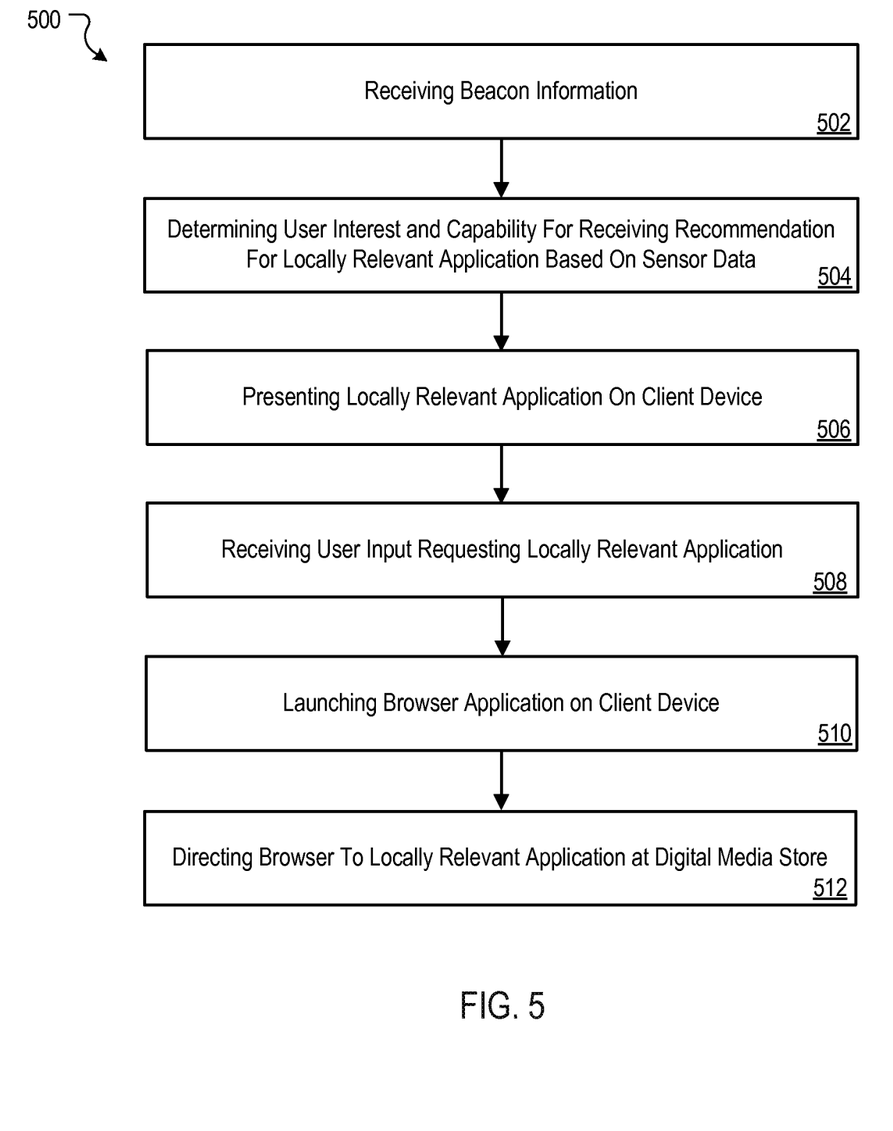
FIG. 5 is an example process performed by a client device for content discovery using beacons.

FIG. 5 is an example process performed by client devices communicating with the beacon management service 212 illustrated in FIGS. 2 and 4. Process 500 can be implemented in client devices having example device architecture 700, as described in reference to FIG. 7.

In some implementations, process 500 can begin when a client device receives beacon information (502). For example, a client device in a beacon environment detects a beacon while in scan mode. The client device receives an advertising packet from the beacon that includes a header and payload. The client device also calculates an RSSI and/or range class (e.g., Far, Near, Immediate) from received signal strength. In some implementations, the client device determines its location using a positioning technology (e.g., WiFi, cellular, GPS). A clock on client device provides timestamps indicating the time of beacon detection, the time of location determination and dwell time. Sensor data can be aggregated by the client device from a number of onboard sensors, including but not limited to a proximity sensor, accelerometers, angular rate sensor, magnetometer, ambient light sensor and one or more positioning systems, as described in reference to FIG. 7.

Process 500 can continue by determining user interest and capability for receiving an application recommendation for a locally relevant software application based on the sensor data (504). For example, a timer can determine if the user has paused near a beacon, which indicates the user's interest in the immediate vicinity of the beacon (e.g., advertising signage). Proximity sensor data and/or ambient light sensor data can indicate that the display is not visible to the user because the client device is concealed.

In some implementations, the orientation of the client device with respect to a three-dimensional Cartesian coordinate frame, such as a North-East-Up coordinate frame, can be calculated from angular sensor data and/or accelerometer data using techniques (e.g., direction cosine matrix, quaternion) well known in the field of navigation. Once the orientation of the device is determined the direction of the display will be determined. If the display screen is facing up and level, the proximity sensor and/or ambient light sensor data indicate the device is not concealed and accelerometer data indicate that the client device is on the user's body (rather than lying on a table), there is a strong likelihood that the user is viewing the display and capable of receiving a recommendation for a locally relevant application.

This information can indicate the user's interest and the user's capability to receive an application recommendation. For example, if the user has paused but the display is not visible, such indicators suggest the user is interested but not capable of receiving a recommendation on the display. The client device can generate an alert (e.g., vibration, audio output) to make the user aware that an application recommendation is available. For example, a vibration can have a specific cadence to indicate an application recommendation. An audio output can be a tone or pattern of tones or an intelligent digital assistant using voice synthesis technology.

Process 500 can continue by presenting a locally relevant application on the display of the client device (506). An icon or other input mechanism representing the application can be presented on the display of the client device. The input mechanism can be a link (e.g., URL) provided by the beacon (e.g., a payload in an advertising packet) that when selected by the user causes a browser to launch (510) on the client device and be directed to the locally relevant application at a network-based digital media store (512), where the application can be accessed and/or downloaded to the client device. In some implementations, the application can be a web-based application provided by a web server computer of the digital media store rather than being downloaded to the client device and run as a client application.

In some implementations, prior to accessing or downloading the application, the client device and/or user can be authenticated using any desired authentication method (e.g., password). In some implementations, the link to the digital media store can be established over a secure channel through the Internet using transport layer security (TLS) or secure sockets layer (SSL).

Example Beacon Manager Portal

Figure 6:
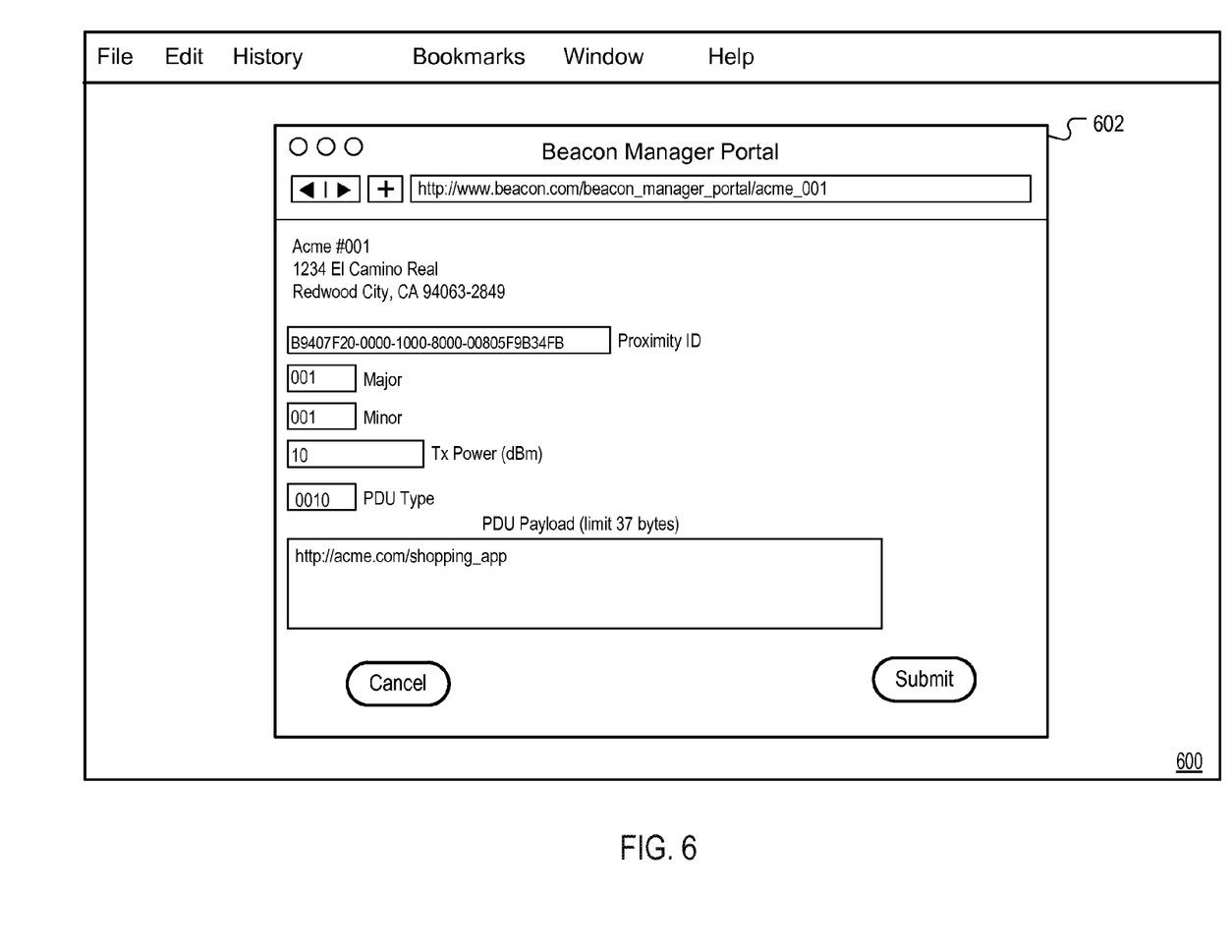
FIG. 6 is illustrates a beacon management portal presented in a browser window of an administrator computer.

FIG. 6 illustrates a beacon management portal presented in a browser window of an administrator computer. In some implementations, beacon management service 212 can provide a beacon manager portal to enterprises for allowing administrators to commission beacons and to specify a proximity profile. A "proximity profile" can be a proximity profile described in the BT Specification or a proprietary proximity profile, such as iBeacon® protocol. The proximity profile can include beacon information and any other information that can be used to manage or control the interaction of beacons with client devices, including without limitation the delivery of services and content to client devices directly or indirectly through the beacons.

Referring to FIG. 6, desktop 600 of an administrator computer (e.g., a personal computer, smart phone, tablet computer) includes browser window 602 displaying a beacon management user interface (UI) for Acme Corporation. The UI is merely illustrative and other UI designs can also be used. In the example UI, the enterprise administrator can use text boxes to specify beacon information for each beacon in a beacon environment (a retail chain store), including proximity ID, major/minor values, transmission power, PDU type and a PDU payload. Once the beacon information is specified, the administrator can submit the information to centralized beacon management service 212. Beacon management service 212 can establish the appropriate data communication channels and connections with the beacons and programs the beacons with the beacon information. Accordingly, the UI allows an enterprise to manage beacon-related advertising and services using a centralized beacon management service that provides flexibility and scalability.

Example Client Architecture

Figure 7:
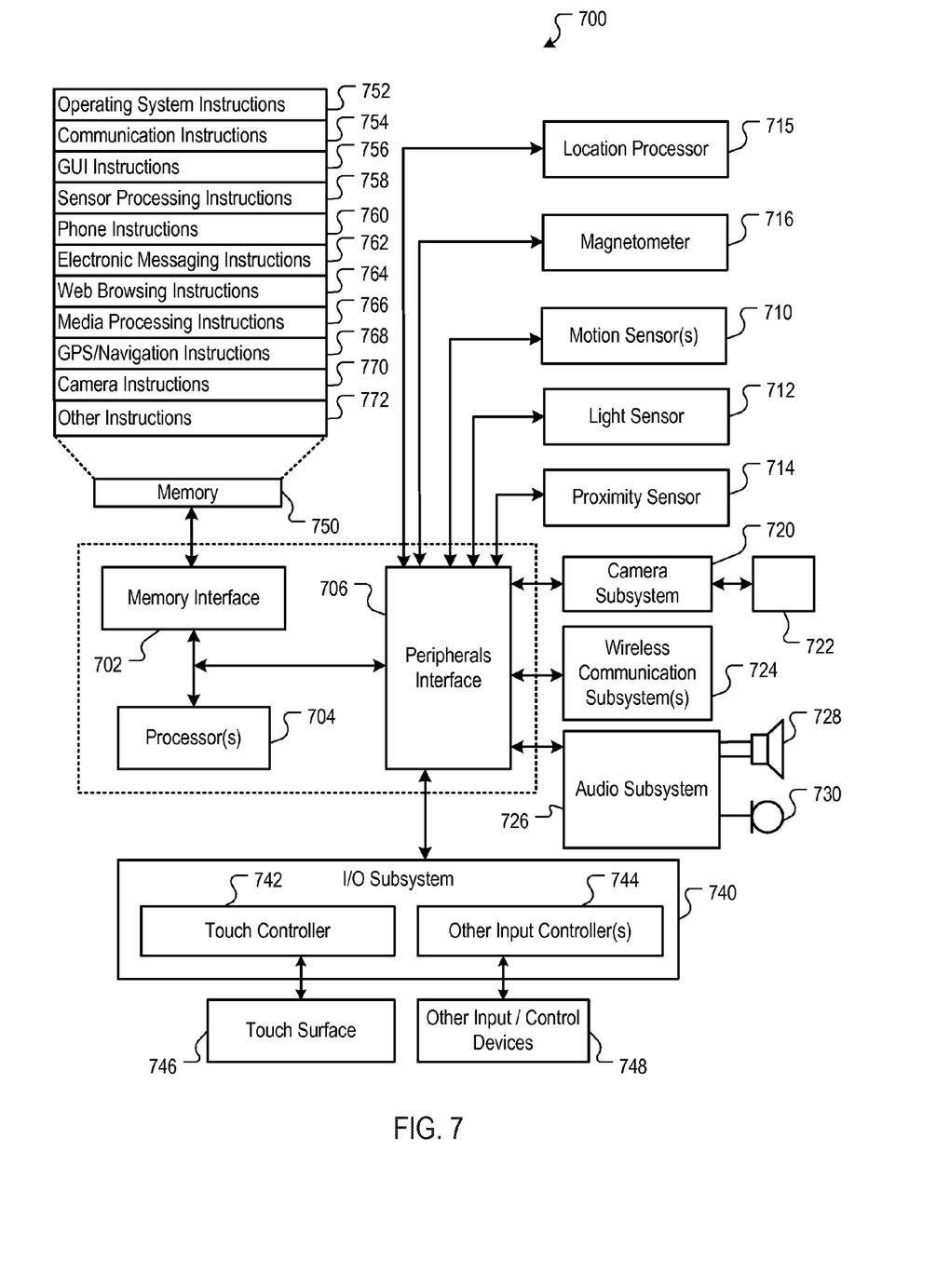
FIG. 7 is a block diagram of example client device architecture for implementing the features and processes described in reference to FIGS. 1-6.

FIG. 7 is a block diagram of example client device architecture 700 for implementing the features and processes described in reference to FIGS. 1-6. Architecture 700 may be implemented in any mobile device for implementing the features and processes described in reference to FIGS. 1-6, including but not limited to portable computers, smart phones and tablet computers, game consoles, wearable computers and the like. Architecture 700 may include memory interface 702, data processor(s), image processor(s) or central processing unit(s) 704, and peripherals interface 706. Memory interface 702, processor(s) 704 or peripherals interface 706 may be separate components or may be integrated in one or more integrated circuits. One or more communication buses or signal lines may couple the various components.

Sensors, devices, and subsystems may be coupled to peripherals interface 706 to facilitate multiple functionalities. For example, motion sensor 710, light sensor 712, and proximity sensor 714 may be coupled to peripherals interface 706 to facilitate orientation, lighting, and proximity functions of the device. For example, in some implementations, light sensor 712 may be utilized to facilitate adjusting the brightness of touch surface 746. In some implementations, motion sensor 710 (e.g., an accelerometer, gyros) may be utilized to detect movement and orientation of the device. Accordingly, display objects or media may be presented according to a detected orientation (e.g., portrait or landscape). Other sensors may also be connected to peripherals interface 706, such as a temperature sensor, a biometric sensor, or other sensing device, to facilitate related functionalities.

Location processor 715 (e.g., GPS receiver chip) may be connected to peripherals interface 706 to provide georeferencing. Electronic magnetometer 716 (e.g., an integrated circuit chip) may also be connected to peripherals interface 706 to provide data that may be used to determine the direction of magnetic North. Thus, electronic magnetometer 716 may be used with an electronic compass application.

Camera subsystem 720 and an optical sensor 722, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 724. Communication subsystem(s) 724 may include one or more wireless communication subsystems. Wireless communication subsystems 724 may include radio frequency receivers and transmitters and/or optical (e.g., infrared) receivers and transmitters. Wired communication systems 724 may include a port, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystem 724 may depend on the communication network(s) or medium(s) over which the device is intended to operate. For example, a device may include wireless communication subsystems designed to operate using known or standardized protocols, including but not limited to: global system for mobile communications (GSM), GPRS, enhanced data GSM environment (EDGE), IEEE 802.x (e.g., WiFi, WiMax), code division multiple access (CDMA), Near Field Communications (NFC), Bluetooth® (including classic Bluetooth® and Bluetooth® low energy (BLE)). Wireless communication subsystems 724 may include hosting protocols such that the device may be configured as a base station for other wireless devices. As another example, the communication subsystems may allow the device to synchronize with a host device using one or more protocols, such as, for example, the TCP/IP protocol, HTTP protocol, UDP protocol, and any other known or standardized protocol.

Audio subsystem 726 may be coupled to a speaker 728 and one or more microphones 730 to facilitate voice-enabled functions, such as voice recognition, voice replication, digital recording, and telephony functions.

I/O subsystem 740 may include touch controller 742 and/or other input controller(s) 744. Touch controller 742 may be coupled to a touch surface 746. Touch surface 746 and touch controller 742 may, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 746. In one implementation, touch surface 746 may display virtual or soft buttons and a virtual keyboard, which may be used as an input/output device by the user.

Other input controller(s) 744 may be coupled to other input/control devices 748, such as one or more buttons, rocker switches, thumb-wheel, infrared port, USB port, and/or a pointer device such as a stylus. The one or more buttons (not shown) may include an up/down button for volume control of speaker 728 and/or microphone 730.

In some implementations, device 700 may present recorded audio and/or video files, such as MP3, AAC, and MPEG video files. In some implementations, device 700 may include the functionality of an MP3 player and may include a pin connector for tethering to other devices. Other input/output and control devices may be used.

Memory interface 702 may be coupled to memory 750. Memory 750 may include high-speed random access memory or non-volatile memory, such as one or more magnetic disk storage devices, one or more optical storage devices, or flash memory (e.g., NAND, NOR). Memory 750 may store operating system 752, such as Darwin, RTXC, LINUX, UNIX, OS X, WINDOWS or an embedded operating system such as VxWorks. Operating system 752 may include instructions for handling basic system services and for performing hardware dependent tasks. In some implementations, operating system 752 may include a kernel (e.g., UNIX kernel).

Memory 750 may also store communication instructions 754 to facilitate communicating with one or more additional devices, one or more computers or servers, including peer-to-peer communications, as described in reference to FIGS. 1-6. Communication instructions 754 may also be used to select an operational mode or communication medium for use by the device, based on a geographic location (obtained by the GPS/Navigation instructions 768) of the device. Memory 750 may include graphical user interface instructions 756 to facilitate graphic user interface processing, including a touch model for interpreting touch inputs and gestures; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GPS/Navigation instructions 768 to facilitate GPS and navigation-related processes; camera instructions 770 to facilitate camera-related processes and functions; and other instructions 772 for performing some or all of the processes, as described in reference to FIGS. 1-6.

Each of the above identified instructions and applications may correspond to a set of instructions for performing one or more functions described above. These instructions need not be implemented as separate software programs, procedures, or modules. Memory 750 may include additional instructions or fewer instructions. Furthermore, various functions of the device may be implemented in hardware and/or in software, including in one or more signal processing and/or application specific integrated circuits (ASICs).

Example Server Architecture

Figure 8:
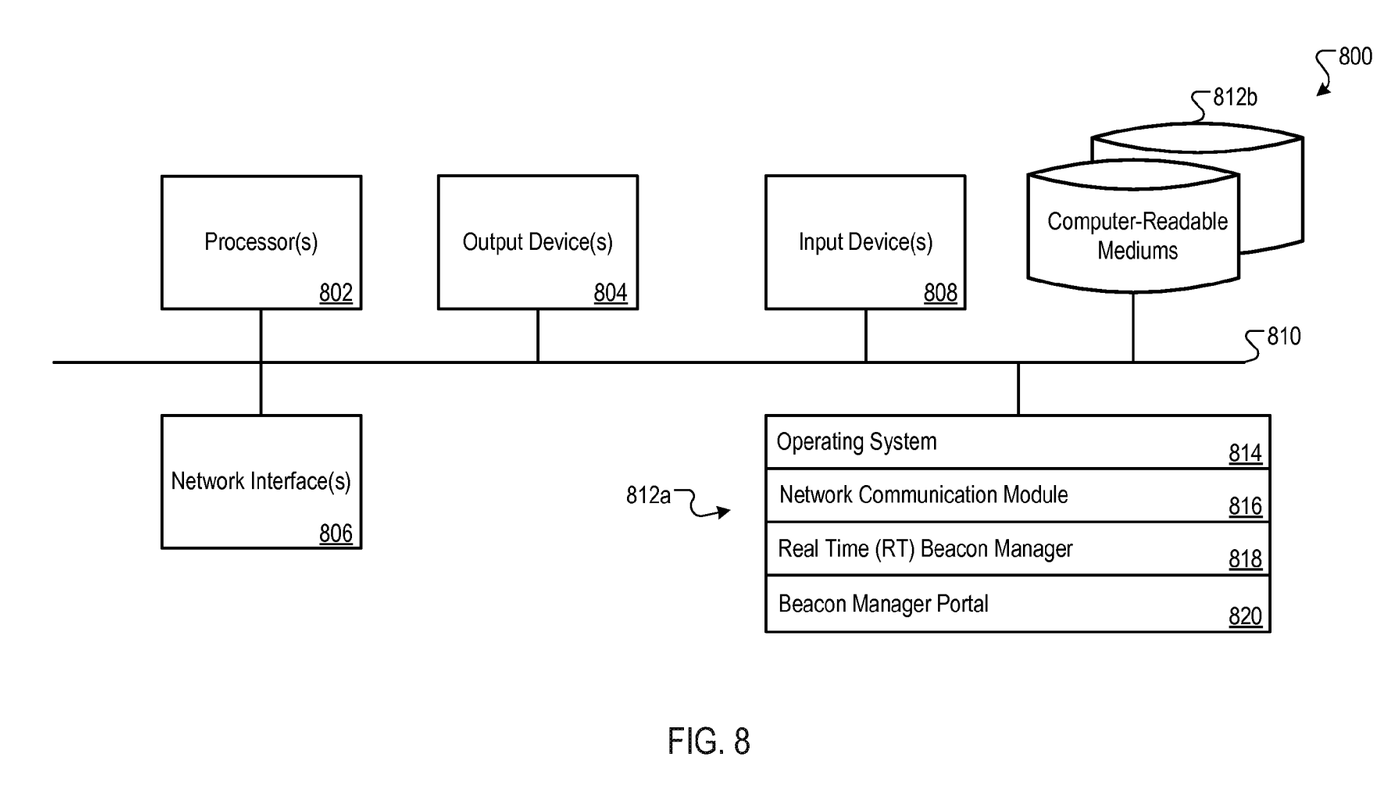
FIG. 8 is a block diagram of example server computer architecture for implementing the features and processes described in reference to FIGS. 1-6.

FIG. 8 is a block diagram of example server computer architecture 800 for implementing the features and processes described in reference to FIGS. 1-6. Other architectures are possible, including architectures with more or fewer components. In some implementations, architecture 800 includes one or more processors 802 (e.g., dual-core Intel® Xeon® Processors), one or more output devices 804 (e.g., LCD), one or more network interfaces 806, one or more input devices 808 (e.g., mouse, keyboard, touch-sensitive display) and one or more computer-readable mediums 812*b* and memory 812*a* (e.g., RAM, ROM, SDRAM, hard disk, optical disk, flash memory, etc.). These components can exchange communications and data over one or more communication channels 810 (e.g., buses), which can utilize various hardware and software for facilitating the transfer of data and control signals between components.

The term "computer-readable medium" refers to any medium that participates in providing instructions to processor 802 for execution, including without limitation, non-volatile media (e.g., optical or magnetic disks), volatile media (e.g., memory) and transmission media. Transmission media includes, without limitation, coaxial cables, copper wire and fiber optics.

Computer-readable mediums 812*b* or memory 812*a* can further include operating system 814 (e.g., Mac OS® server, Windows® NT server), network communication module 816, real time beacon manager module 818 and beacon manager portal module 810. Operating system 814 can be multi-user, multiprocessing, multitasking, multithreading, real time, etc. Operating system 814 performs basic tasks, including but not limited to: recognizing input from and providing output to devices 804; keeping track and managing files and directories on storage devices 812*b* and memory 812*a*; controlling peripheral devices; and managing traffic on the one or more communication channels 810. Network communications module 816 includes various components for establishing and maintaining network connections (e.g., software for implementing communication protocols, such as TCP/IP, HTTP, etc.). Beacon manager module 818 performs real time beacon commissioning and other beacon services as described in reference to FIGS. 1-6. Beacon manage portal module 810 provides a web portal to enterprises as described in reference to FIGS. 1-6. Beacon manage portal module 810 can also establish a web feed (e.g., XML feed) to beacon management service 212 from enterprise computer systems.

Architecture 800 can be included in any computer device, including one or more server computers each having one or more processing cores. Architecture 800 can be implemented in a parallel processing or peer-to-peer infrastructure or on a single device with one or more processors. Software can include multiple software components or can be a single body of code.

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with an author, the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
receiving, by a device operating in an environment, a radio frequency (RF) signal from an RF beacon deployed in the environment;
determining, by the device, based on one or more characteristics of the received RF signal, that the device is within a threshold range of the RF beacon;
determining, by the device, that the device is moving at a speed that is less than a threshold speed;
determining, by the device, an orientation of the device with respect to a coordinate frame;
determining, by the device, based on measurements taken by one or more sensors, whether the device is concealed;
generating, by the device, a recommendation to access a software application that is relevant to the environment, wherein the recommendation is presented in a visual form on a display of the device if the device is determined to be facing up and not concealed;
receiving, by the device, from the RF beacon, a unique identifier of the RF beacon;
comparing, by the device, the unique identifier to a list of links stored on a database, wherein each of the links are for downloading respective software applications;
based on the comparison, receiving, by the device, from the database, a link to download the software application, wherein the link corresponds to the unique identifier of the RF beacon;
receiving, by the device, an invocation of the link from a user of the device that causes the device to download the software application; and
in response to receiving the invocation, downloading, by the device, the software application over a communication link separate from a communication link between the device and the RF beacon,
wherein an alert is presented in one or both of an audio form and a tactile form to notify the user of the device that the recommendation has been generated if the device is determined to be not facing up or concealed.

2. The method of claim 1, where presenting the alert comprises:
generating the alert on the device regarding the recommendation; and
presenting the alert.

3. The method of claim 1, where the alert is force feedback or audio output.

4. The method of claim 1, where the alert is a vibration.

5. The method of claim 1, where determining whether the device is concealed is based at least in part on readings from a proximity sensor onboard the device.

6. The method of claim 1, where determining whether the device is concealed is based at least in part on readings from an ambient light sensor onboard the device.

7. The method of claim 1, where presenting the recommendation in visual form is based at least in part on sensor data that includes accelerometer data for indicating that the device is moving or stationary for a period of time.

8. The method of claim 1, where presenting the recommendation in visual form is based at least in part on detecting a change in range from the beacon.

9. The method of claim 8, where detecting a change in range from the beacon includes detecting a change from a first range class to a second range class.

10. The method of claim 1, wherein the software application is pre-populated with data that is determined based on information received from the RF beacon.

11. The method of claim 1, wherein the software application is a shopping application that corresponds to a store proximate to the environment.

12. The method of claim 1, wherein the communication link separate from the communication link between the device and the RF beacon is a secure channel through the Internet.

13. An apparatus comprising:
one or more processors;
one or more sensors;
a display;
a wireless transceiver;
memory coupled to the one or more processors and configured to store instructions, which, when executed by the one or more processors, causes the one or more processors to perform operations comprising:
receiving a radio frequency (RF) signal from an RF beacon deployed in an environment;
determining, based on one or more characteristics of the received RF signal, that the apparatus is within a threshold range of the RF beacon;
determining, by the apparatus, that the apparatus is moving at a speed that is less than a threshold speed;
determining, by the apparatus, an orientation of the apparatus with respect to a coordinate frame;
determining, by the apparatus, based on measurements taken by the one or more sensors, whether the apparatus is concealed;
generating, by the apparatus, a recommendation to access a software application that is relevant to the environment, wherein the recommendation is presented in a visual form on the display of the apparatus if the apparatus is determined to be facing up and not concealed;
receiving, by the apparatus, from the RF beacon, a unique identifier of the RF beacon;
comparing, by the apparatus, the unique identifier to a list of links stored on a database, wherein each of the links are for downloading respective software applications;
based on the comparison, receiving, by the apparatus, from the database, a link to download the software application, wherein the link corresponds to the unique identifier of the RF beacon;
receiving, by the apparatus, an invocation of the link from a user of the apparatus that causes the apparatus to download the software application; and
in response to receiving the invocation, downloading, by the apparatus, the software application over a communication link separate from a communication link between the apparatus and the RF beacon,
wherein an alert is presented in one or both of an audio form and a tactile form to notify the user of the apparatus that the recommendation has been generated if the apparatus is determined to be not facing up or concealed.

14. The apparatus of claim 13, where presenting the alert comprises:
generating the alert on the apparatus regarding the recommendation; and
presenting the alert.

15. The apparatus of claim 13, where the alert is force feedback or audio output.

16. The apparatus of claim 13, where the alert is a vibration.

17. The apparatus of claim 13, where determining whether the apparatus is concealed is based at least in part on readings from a proximity sensor onboard the apparatus.

18. The apparatus of claim 13, where determining whether the apparatus is concealed is based at least in part on readings from an ambient light sensor onboard the apparatus.

19. The apparatus of claim 13, where presenting the recommendation in visual form is based at least in part on sensor data that includes accelerometer data for indicating that the apparatus is moving or stationary for a period of time.

20. The apparatus of claim 13, where presenting the recommendation in visual form is based at least in part on detecting a change in range from the beacon.

21. The apparatus of claim 20, where detecting a change in range from the beacon includes detecting a change from a first range class to a second range class.

22. A non-transitory computer-readable medium storing instructions operable to cause a device operating in an environment to perform operations comprising:
receiving, by the device operating in the environment, a radio frequency (RF) signal from an RF beacon deployed in the environment;
determining, by the device, based on one or more characteristics of the received RF signal, that the device is within a threshold range of the RF beacon;
determining, by the device, that the device is moving at a speed that is less than a threshold speed;
determining, by the device, an orientation of the device with respect to a coordinate frame;
determining, by the device, based on measurements taken by one or more sensors, whether the device is concealed;
generating, by the device, a recommendation to access a software application that is relevant to the environment, wherein the recommendation is presented in a visual form on a display of the device if the device is determined to be facing up and not concealed;
receiving, by the device, from the RF beacon, a unique identifier of the RF beacon;
comparing, by the device, the unique identifier to a list of links stored on a database, wherein each of the links are for downloading respective software applications;
based on the comparison, receiving, by the device, from the database, a link to download the software application, wherein the link corresponds to the unique identifier of the RF beacon;
receiving, by the device, an invocation of the link from a user of the device that causes the device to download the software application; and
in response to receiving the invocation, downloading, by the device, the software application over a communication link separate from a communication link between the device and the RF beacon,
wherein an alert is presented in one or both of an audio form and a tactile form to notify the user of the device that the recommendation has been generated if the device is determined to be not facing up or concealed.

23. The non-transitory computer-readable medium of claim 22, wherein presenting the alert comprises:
generating the alert on the device regarding the recommendation; and
presenting the alert.

24. The non-transitory computer-readable medium of claim 22, where the alert is force feedback or audio output.

25. A method comprising:
receiving, by a device operating in an environment, a radio frequency (RF) signal from an RF beacon deployed in the environment;
determining, by the device, based on one or more characteristics of the received RF signal, that the device is within a threshold range of the RF beacon;
determining, by the device, that the device is moving at a speed that is less than a threshold speed;
determining, by the device, an orientation of a display of the device with respect to a coordinate frame;
determining, by the device, based on measurements taken by one or more sensors, whether the device is concealed;
generating, by the device, a recommendation to access a software application that is relevant to the environment, wherein the recommendation is presented in a visual form on the display of the device if the device is determined to be not concealed and the orientation of the display is determined to be indicative of user interaction with the device;
receiving, by the device, from the RF beacon, a unique identifier of the RF beacon;
comparing, by the device, the unique identifier to a list of links stored on a database, wherein each of the links are for downloading respective software applications;
based on the comparison, receiving, by the device, from the database, a link to download the software application, wherein the link corresponds to the unique identifier of the RF beacon;
receiving, by the device, an invocation of the link from the user of the device that causes the device to download the software application; and
in response to receiving the invocation, downloading, by the device, the software application over a communication link separate from a communication link between the device and the RF beacon,
wherein an alert is presented in one or both of an audio form and a tactile form to notify the user of the device that the recommendation has been generated if the device is determined to be concealed or the orientation of the display is determined to not be indicative of user interaction with the device.

* * * * *

UNITED STATES PATENT AND TRADEMARK OFFICE
CERTIFICATE OF CORRECTION

PATENT NO. : 9,998,867 B2  
APPLICATION NO. : 14/500683  
DATED : June 12, 2018  
INVENTOR(S) : Craig J. Keithley Page 1 of 1

It is certified that error appears in the above-identified patent and that said Letters Patent is hereby corrected as shown below:

On the Title Page

Column 1 item (Notice), Line 3, after "0 days." Delete "days.".

Signed and Sealed this
Seventh Day of August, 2018

Andrei Iancu
*Director of the United States Patent and Trademark Office*